United States Patent
Albou

(10) Patent No.: US 6,616,315 B2
(45) Date of Patent: Sep. 9, 2003

(54) HEADLIGHT OF THE ELLIPTICAL TYPE FOR A MOTOR VEHICLE CAPABLE OF GENERATING SEVERAL LIGHT BEAMS

(75) Inventor: Pierre Albou, Bobigny Cedex (FR)

(73) Assignee: Valeo Vision (FR)

( * ) Notice: Subject to any disclaimer, the term of this patent is extended or adjusted under 35 U.S.C. 154(b) by 0 days.

(21) Appl. No.: 10/113,206

(22) Filed: Mar. 28, 2002

(65) Prior Publication Data

US 2003/0038573 A1 Feb. 27, 2003

(30) Foreign Application Priority Data

Mar. 29, 2001 (FR) .......................................... 01 04474

(51) Int. Cl.$^7$ ............................................... F21V 7/00
(52) U.S. Cl. ....................... 362/518; 362/487; 362/507; 362/517; 362/543; 362/346; 362/245; 362/247
(58) Field of Search ................................ 362/518, 485, 362/487, 507, 516, 517, 543, 243, 346, 544, 245, 247

(56) References Cited

U.S. PATENT DOCUMENTS 1,961,836 A * 6/1934 Warner ........................ 362/517
6,402,356 B2 * 6/2002 Gotou .......................... 362/543

FOREIGN PATENT DOCUMENTS

FR 2735849 A1 * 12/1996 ............ F21M/3/05
FR 2 797 029 2/2001

OTHER PUBLICATIONS

Patent Abstracts of Japan, vol. 018, No. 514, Sep. 28, 1994 (JP 06–176602 published Jun. 24, 1994).
French Search Report, Nov. 2, 2001.

* cited by examiner

Primary Examiner—Stephen Husar
Assistant Examiner—Sharon Payne
(74) Attorney, Agent, or Firm—Morgan & Finnegan, LLP

(57) ABSTRACT

The present invention relates to a headlight for a motor vehicle, comprising a first reflector (20, 20') of elliptical shape, at a first focus ($F_1$) of which is located a main light source (10), the light rays emitted by this source (10) and reflected by the elliptical reflector (20, 20') being directed towards a concentration spot located at a second focus ($F_2$) of the elliptical reflector (20, 20'), the first ($F_1$) and second ($F_2$) focuses of the elliptical reflector (20, 20') defining a main optical axis (Oy) of the elliptical reflector (20, 20'), a convergent lens (30) being placed such that its optical axis is coincident with the main optical axis (Oy) of the elliptical reflector (20, 20') and that the second focus ($F_2$) of the reflector (20, 20') is located on the focal line (LF) of the lens (30) in order to emit a light beam of rays parallel to the main optical axis (Oy).

According to the present invention, the headlight comprises at least one optical system concentrating the light rays emitted by a second light source (60) in the direction of a second optical axis (O'y') passing through the optical centre (C) of the lens (30) and over a second concentration spot located on the focal line (LF) of the lens (30), and in that the first (Oy) and second (O'y') optical axes form an angle (α) of between 20 et 45° between them.

7 Claims, 4 Drawing Sheets

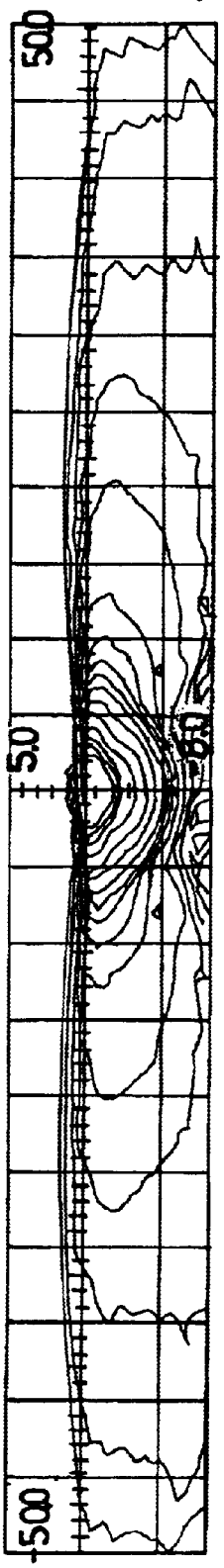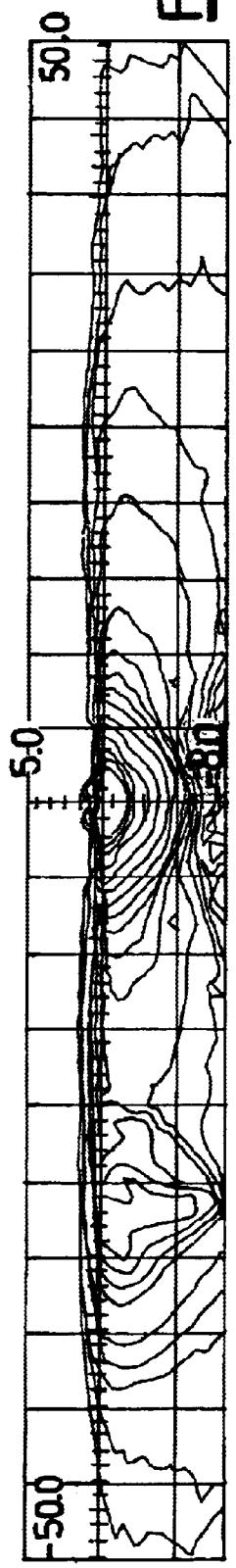

HEADLIGHT OF THE ELLIPTICAL TYPE FOR A MOTOR VEHICLE CAPABLE OF GENERATING SEVERAL LIGHT BEAMS

The present invention relates to illumination systems for motor vehicles, these systems providing an improved illumination beam in order to illuminate regions of the road where the vehicle is travelling other than those which are located along the longitudinal axis of the vehicle, in order to fulfil, for example, a cornering function.

A cornering function makes it possible to illuminate, when a vehicle is moving over a non-rectilinear trajectory, the portions of the road which are intended to be approached by the vehicle, which are to the front and at the side thereof, and which consequently are not illuminated or are badly illuminated by the conventional dipped or full-beam headlights.

In order to emit a light beam of this sort, it is known to provide the cornering function by altering the orientation of the headlight beam. A solution of this sort is not applicable to a dipped beam of the European code type, in which the rotation of the beam would risk leading to loss of adjustment in the photometry of the beam, which would then become incompatible with the regulations currently in force. Furthermore, from the perspective of the next change in the regulations permitting the rotation of the dipped beam, it will not then be desirable to rotate the main headlight by too great an amplitude, because of the total size of this headlight.

One solution therefore resides in altering the orientation of the beam of an additional headlight. Various means have already been proposed in order to obtain this result, which all involve optical components which can be moved in rotation and/or in rotation, when it is not the complete headlight which is rotated. This results in mechanical complication of the headlight and of its movement-control members, which is detrimental to the reliability of the system thus designed, and which substantially increases the cost of a cornering headlight of this sort.

Another known solution consists in placing, on the vehicle, a fixed headlight, the optical axis of which makes a larger or smaller angle with the longitudinal axis of the vehicle, the right headlight being oriented towards the right of the vehicle and the left headlight towards the left. The cornering beam is then obtained by the gradual or immediate switching-on of the headlight located on the side to which the vehicle turns. This solution makes it necessary to have an additional pair of headlights available on the vehicle, hence a large size of the illumination system of the vehicle.

The present invention is looked at in this context and its aim is to provide an illuminating headlight for a motor vehicle which is able to illuminate regions located outside the longitudinal axis of the vehicle, while complying with the photometry of dipped and full beams, without requiring an additional headlight dedicated to this illumination, and without requiring a movable part.

The object of the present invention is therefore a headlight for a motor vehicle, comprising a first reflector of elliptical shape, at a first focus of which is located a main light source, the light rays emitted by this source and reflected by the elliptical reflector being directed towards a concentration spot located at a second focus of the elliptical reflector, the first and second focuses of the elliptical reflector defining a main optical axis of the elliptical reflector, a convergent lens being placed such that its optical axis is coincident with the main optical axis of the elliptical reflector and that the second focus of the reflector is located on the focal line of the lens in order to emit a light beam of rays parallel to the main optical axis.

According to the present invention, the headlight comprises at least one optical system concentrating the light rays emitted by a second light source in the direction of a second optical axis passing through the optical centre of the lens and over a second concentration spot located on the focal line of the lens, and the first and second optical axes form an angle of between 20 et 45° between them.

According to other advantageous and non-limiting characteristics of the invention:

- the optical system comprises a paraboloidal reflector combined with an objective lens focusing the light rays emitted by the second light source and reflected by the second reflector onto the second concentration spot;
- the optical system comprises a second elliptical reflector, the second light source being placed on a first focus of the second reflector, the second focus of the second reflector being located on the focal line of the lens, the focuses of the second reflector being aligned on the second optical axis;
- the first reflector consists of two half-ellipsoids having the same focuses and different eccentricities;
- the half-ellipsoid closest to the second reflector has an eccentricity greater than that of the half-ellipsoid furthest away from the second reflector;
- a mask is placed on the main optical axis in the immediate vicinity of the focal line of the lens in order to delimit a cut-off in the beam of light rays coming from the main light source;
- a mask is placed on the second optical axis in the immediate vicinity of the focal line of the lens in order to delimit a cut-off in the beam of light rays parallel to the second optical axis.

Other aims, characteristics and advantages of the present invention will become more clearly apparent from the description which will now be given of one exemplary embodiment given by way of non-limiting example with reference to the appended drawings in which:

FIG. 7 shows, by means of a set of isocandela curves, the appearance of the beam generated by the two headlights of a vehicle when the latter is following a straight road, and FIG. 8 shows, by means of a set of isocandela curves, the appearance of the beam generated by the two headlights of a vehicle when the latter is following a curve to the left.

Figure 1:
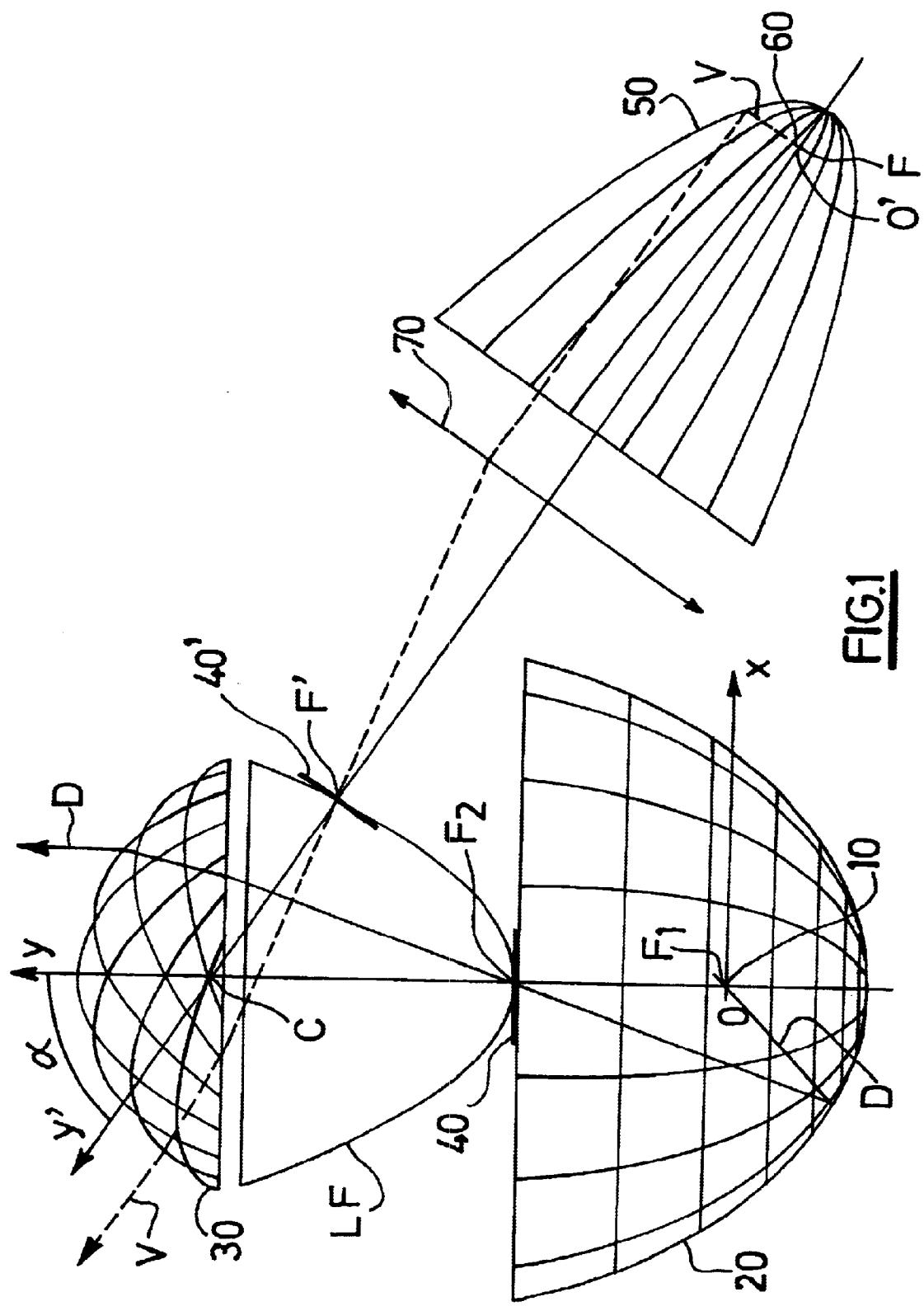
FIG. 1 shows a schematic top view of a left headlight of a motor vehicle according to a first embodiment of the present invention.

By convention, three orthogonal directions Ox, Oy and Oz are defined, which will be used in the description and in the figures, Oy being the general direction of the full or dipped light beam emitted by the headlight, and parallel to the longitudinal axis of the vehicle, Ox being the horizontal direction perpendicular to Oy, and Oz the vertical direction perpendicular to Ox and Oy and in the plane of FIG. 1.

A light source 10, such as the filament of a standardized "H1" or "H7" incandescent lamp, or else the electric arc of a discharge lamp, is placed at the apex O of this tri-rectangular trihedron.

An elliptical reflector 20 is placed such that one of its focuses $F_1$ is located on this light source 10. In a known manner, the light rays from the source 10 are reflected by the reflector 20 so that they are concentrated at the second focus $F_2$ of the elliptical reflector 20 in order to form a concentration spot thereon. A piano-convex convergent lens 30 is placed such that its object focus is superimposed on the second focus $F_2$, so that the light rays received by the lens 30 emerge therefrom in a beam of rays which are mutually parallel and parallel to the axis Oy. For a better understanding of FIG. 1, the path of a single one of these light rays D has been shown in this FIG. 1.

The light source 10-reflector 20-lens 30 assembly thus constitutes an illumination headlight of the elliptical type according to the prior art. If this headlight is designed to form a dipped beam, for example of European type, a mask 40 may be placed in the immediate vicinity of the second focus $F_2$, so as to form the statutory cut-off of the dipped beam. In order that the headlight designed in this way is also able to project a full beam, it is conventional to make the mask 40 so that it can be retracted into a position in which it no longer intercepts some of the light rays reflected by the reflector 20 and passing above the focus of the lens.

According to the present invention, a second reflector 50 is provided in order to endow the headlight with what has just been described as a cornering function. The second reflector 50 is placed in order to provide, in co-operation with the lens 30, a light beam in a direction O'y' passing through the optical centre C of the lens 30 and forming a large angle α, for example greater than or equal to 30°, with the axis Oy of the first reflector 20.

In the embodiment shown in FIG. 1, the second reflector 50 is of the paraboloidal type, a light source 60 being placed at the focus F of this paraboloid. Here again, the source 60 may consist of the filament of a standardized "H1" or "H7" incandescent lamp, or else the electric arc of a discharge lamp. The rays emitted by the source 60 and reflected by the second reflector 50 thus form a beam of rays parallel to the optical axis O'y'.

An objective lens 70 is placed in the path of the light rays reflected by the second reflector 50 in order to focus these rays at a point F' on the focal surface of the lens 30. The focal surface of the lens 30 is the geometrical location of the points in object space of the lens 30, the images of which are sent to infinity in any direction with respect to the optical centre of the lens 30 in the image space of this lens 30. The intersection of this focal surface with a plane passing through the optical axis of the lens 30 is shown by a focal line LF. The result of this is therefore that the light rays emerging from the objective lens 70 and incident on the lens 30 emerge from the latter as a beam of rays parallel to the axis O'y'. A mask 40' could be placed in the immediate vicinity of the focal line LF in order to delimit, in the beam of rays parallel to the axis O'y', a cut-off, for example at the same level as the cut-off created by the mask 40.

FIG. 1 illustrates the structure of a headlight fitted on the left side of the vehicle. The right headlight can be easily deduced therefrom, by symmetry with respect to a vertical plane parallel to the axis Oy and passing through the longitudinal axis of the motor vehicle.

The use of the headlight which has just been described can be easily understood on reading the text above. When the vehicle equipped with the headlights of the present invention travels at night over a rectilinear path, only the light source 10 of the elliptical reflector 20 is switched on. The result of this is that the driver of the vehicle perceives an illumination beam according to his practice and his expectations, the headlights of the elliptical type currently becoming increasingly widespread.

When the vehicle approaches a bend or a winding part of the road, sensors (not shown) for sensing various parameters of the vehicle, such as the angle of rotation of the steering wheel or the steering lock angle of the front wheels, the speed of the vehicle and/or of the external environment, for example provided by a navigation system, detect the intention of the driver to turn in a given direction or the imminence of a change in direction. These sensors then order the gradual or all-or-nothing switching-on of the second light source 60, via an electronic power circuit (not shown), if, in the example shown, the actual or expected change in direction is to the left.

The light source 60 then emits light rays such as the ray V shown in dotted line in FIG. 1, transformed into a parallel beam by the reflector 50, then into a convergent beam by the objective lens 70, then again into a substantially parallel beam by the lens 30. The result of this is the illumination of a region located largely outside the longitudinal axis of the vehicle, but in the direction where the latter will be subsequently.

An illumination headlight for a motor vehicle has thus been produced, which completely complies with the photometry of the dipped and full beams since it uses the conventional optical components in order to fulfil these functions, and which can illuminate regions located outside the longitudinal axis of the vehicle, in order to fulfil, for example, a cornering function, without the need for a movable part, and by using only an additional reflecting mirror, co-operating with the lens of the dipped and/or full-beam headlight.

Figure 2:
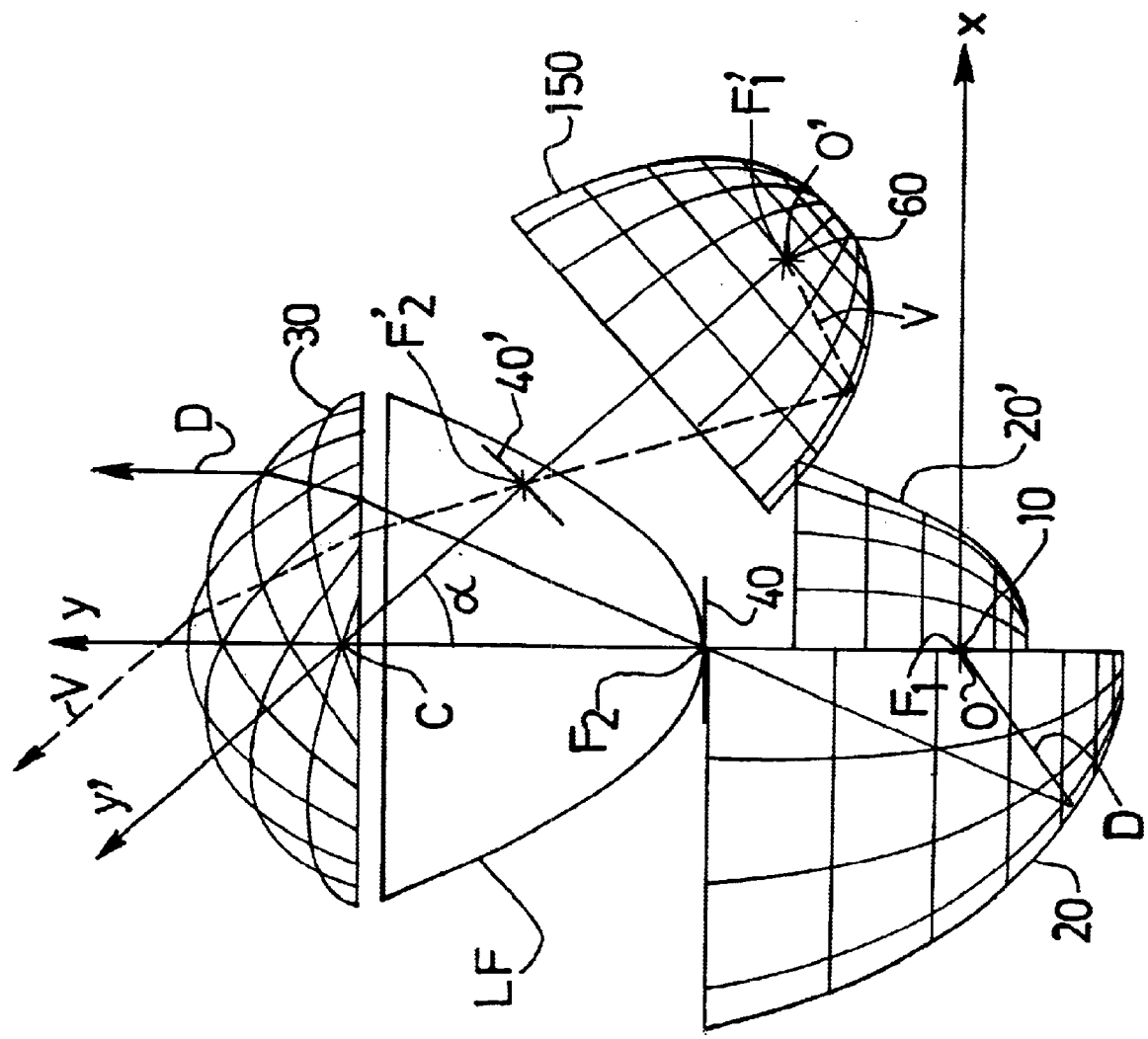
FIG. 2 shows a schematic top view of a left headlight of a motor vehicle according to a second embodiment of the present invention.

FIG. 2 shows a second embodiment of the present invention, in which the second reflector 150 is also of the elliptical type, the second light source 60 being placed at a focus $F'_1$ of this elliptical surface. Here again, the source 60 may consist of the filament of a standardized "H1" or "H7" incandescent lamp, or else the electric arc of a discharge lamp. The light rays coming from this source 60 and reflected by the second reflector 150 are thus focused in a second concentration spot, located at the focus $F'_2$ of the second elliptical reflector 150.

The second focus $F'_2$ of the second reflector 150 is located on the focal line LF of the lens 30 or in its immediate vicinity, such that the light rays coming from the source 60 and reflected by the second reflector 150 pass through this focus $F'_2$ then pass through the lens 30 in order to emerge therefrom while forming a beam of rays parallel to the axis O'y' passing through the optical centre C of the lens 30. Here again, in order not to overburden FIG. 2, the path of a single one of these light rays V has been shown in dotted line in this FIG. 2.

The angle α between the optical axes Oy and O'y' will advantageously be chosen so that a high proportion of the light rays V incident on the plane entry face of the lens 30 enter this lens, and so that only a small part of these rays is reflected by this plane face.

The headlight according to this second embodiment operates exactly as the one described above, and this operation will not be repeated in detail.

When the vehicle equipped with the headlights shown in FIG. 2 travels at night over a straight road, only the light source 10 of the first elliptical reflector 20 is switched on.

When a change in direction of the vehicle is detected by sensors for sensing parameters or environment of the vehicle, the switching-on of the second light source 60 is ordered. The latter then emits light rays such as the ray V shown in dotted line in FIG. 2, in order to illuminate a region located largely outside the longitudinal axis of the vehicle, but in the direction where the latter will be subsequently.

In order to make the headlight designed according to this second embodiment more compact, provision may advantageously be made to produce one of the reflectors according to one configuration in two asymmetric parts, so as to reduce the size thereof and to allow the two reflectors forming this headlight to be brought closer together.

It is possible, for example, to choose to produce the first reflector 20 in two parts, the right part 20' (in FIG. 2) of the second reflector 150 having less spread in the direction Ox than its left part, for a headlight intended to be installed on the left side of a vehicle. A construction of this sort makes it possible to bring the second reflector 150 closer to the axis Oy, and to produce a smaller headlight. Furthermore, a configuration of this sort makes it possible to reach the curve LF at points closer to the axis Oy, with smaller angles of incidence on the plane entry face of the lens, and therefore to reach angles of incidence on this plane face close to 25°, for the cornering beam, with an acceptable efficiency.

The headlight intended to be installed on the right side of the vehicle will of course have a configuration which is symmetrical with respect to a vertical plane parallel to the axis Oy and passing through the longitudinal axis of the motor vehicle.

The reflector of the headlight of FIG. 2 consists of two half-ellipsoids 20 and 20'. These two halves co-operate with the same light source 10 and the same lens 30. They therefore have the same focuses $F_1$ and $F_2$, but different eccentricities. The eccentricity of the half-ellipsoid 20' is thus greater than that of the half-ellipsoid 20. A reflector of this sort, consisting of two half-shells, may advantageously be produced according to the teachings of document FR-A-2 735 849. Such a design thus makes it possible to produce the half-shells forming the second reflector 150 as a single piece with the half-shells forming the reflector 20'.

The appearance of the beam generated by the headlight according to the present invention, under various conditions, has been shown in FIGS. 3 to 8, by means of sets of isocandela curves.

Figure 3:
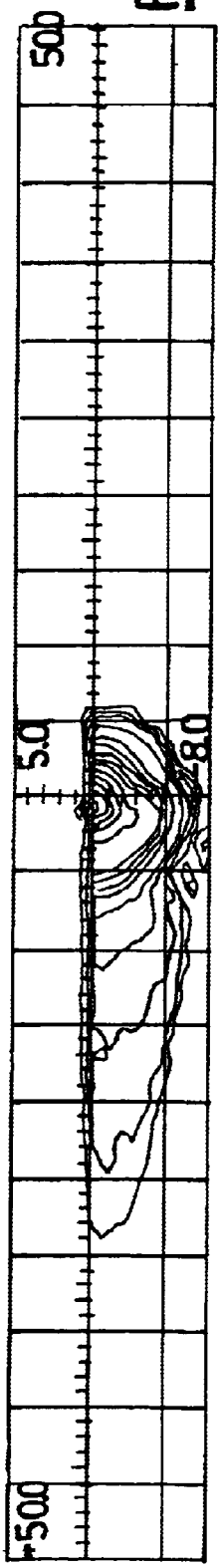
FIG. 3 shows, by means of a set of isocandela curves, the appearance of the beam generated by a first region of the reflector of FIG. 2.
Figure 4:
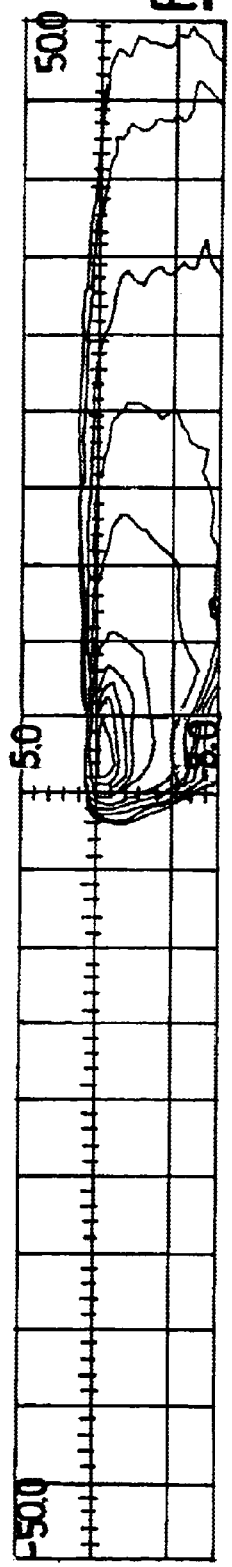
FIG. 4 shows, by means of a set of isocandela curves, the appearance of the beam generated by a second region of the reflector of FIG. 2.

FIG. 3 shows the beam generated by the right part 20' alone. This part 20' contributes to forming the left part of the light beam. FIG. 4 shows the beam generated by the left part 20 alone, which contributes to forming the right part of the light beam. The two parts 20 and 20' together thus generate the beam shown in FIG. 5. It is found that such a beam has good uniformity, good concentration in the axis of the vehicle, and that it is perfectly suited, by virtue of the presence of the mask 40, to forming a dipped beam for travel over a straight road.

When the vehicle equipped with the headlight according to the present invention approaches a bend or travels in this bend, the light source 60 is then switched on. The light rays V which it emits are then concentrated on the second focus $F'_2$, located in the immediate vicinity of the focal line LF of the lens 30. The lens 30 thus forms, from the concentration spot at $F'_2$, a beam of rays parallel to the direction O'y', which is superimposed on the dipped beam of FIG. 5, in order to give the beam of FIG. 6.

Figure 6:
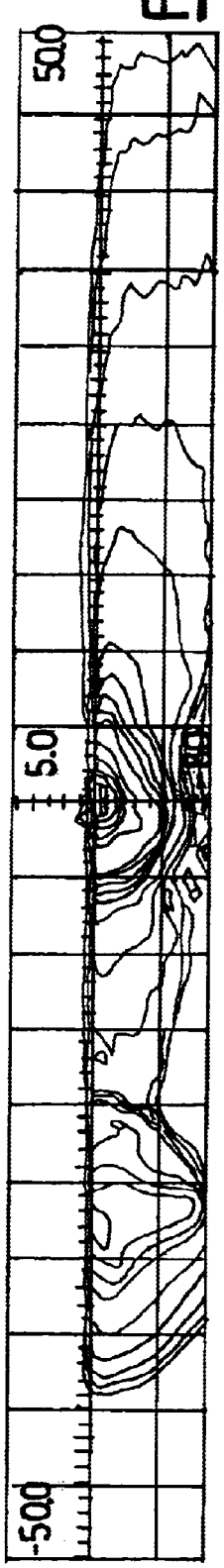
FIG. 6 shows, by means of a set of isocandela curves, the appearance of the beam generated when the two light sources of a headlight according to the present invention are switched on simultaneously.

FIG. 6 shows clearly that the light beam comprises a second intensity maximum, in this example making an angle of between 25 and 30° with the longitudinal axis of the vehicle. This second intensity maximum provides the driver of the vehicle with good visibility of the portions of the road which will be approached by the vehicle.

FIGS. 3 to 6 show the appearance of the beam generated by the single left headlight of the vehicle. FIG. 7 shows the appearance of the total illumination beam, provided by the left and right headlights of the vehicle. As was seen above, the structure of the right headlight can be easily deduced from that of the left headlight by means of simple symmetry with respect to a vertical plane parallel to the axis Oy and passing through the longitudinal axis of the motor vehicle.

Figure 5:
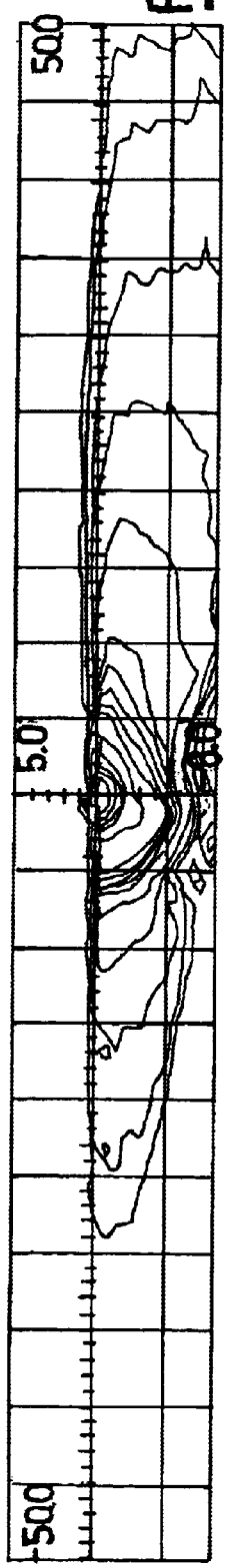
FIG. 5 shows, by means of a set of isocandela curves, the appearance of the beam generated by both the first and second regions of the reflector of FIG. 2.

The beam generated by the two headlights of the vehicle when only the two light sources 10 are switched on therefore shows the superposition of a beam such as the one shown in FIG. 5, and of a beam which is symmetrical with respect to the central vertical axis. Such a beam is shown in FIG. 7. It can be seen that such a beam has a considerable width and very good uniformity, which complies with the regulations in all aspects.

When the vehicle equipped with both the left and right headlights according to the present invention approaches a bend or travels around this bend, the light source 60 is then switched on in the headlight located on the inside of this bend. The light rays V which it emits are then concentrated on the second focus located in the immediate vicinity of the focal line LF of the lens of this headlight inside the bend. This lens thus forms, from this concentration spot, a beam of rays parallel to the direction O'y' directed towards the inside of the bend, which is superimposed on the dipped beam of FIG. 7, in order to give the beam of FIG. 8, in the example where the bend is to the left.

Here again, according to this second embodiment, an illumination headlight for a motor vehicle has therefore been produced, which completely complies with the photometry of illumination beams, and which can illuminate regions located outside the longitudinal axis of the vehicle, in order to fulfil, for example, a cornering function, without the need for a movable part, and by using only an additional reflecting mirror, co-operating with the lens of the original headlight.

Of course, the present invention is not limited to the embodiments which have been described, but a person skilled in the art will, on the contrary, provide it with numerous modifications which are within its scope. Thus, for example, a second additional reflector may be associated with the reflector generating a light beam in the axis of the vehicle, in order to illuminate other regions where it is desired to provide improved visibility for the driver. It will be possible, for example, to place such an additional reflector below the axial headlight, in order to illuminate regions located high up, for example the signs carrying information concerning the motorways. The illumination from the light source associated with these additional reflectors may then be controlled by a switch on the dashboard of the vehicle. Similarly, in the first embodiment, the elliptical reflector associated with the first light source may also be produced in two asymmetric parts, so as to bring the parabolic reflector closer to the first reflector.

What is claimed is:

1. A headlight for a motor vehicle, comprising a first reflector of elliptical shape, at a first focus of which is located a main light source, the light rays emitted by this source and reflected by the elliptical reflector being directed towards a concentration spot located at a second focus of the elliptical reflector, the first and second focuses of the elliptical reflector defining a main optical axis of the elliptical reflector, a convergent lens being placed such that its optical axis is coincident with the main optical axis of the elliptical reflector and that the second focus of the reflector is located on the focal line of the lens in order to emit a light beam of rays parallel to the main optical axis, wherein the headlight comprises at least one optical system concentrating the light rays emitted by a second light source in the direction of a second optical axis passing through the optical centre of the lens and over a second concentration spot located on the focal line of the lens, and wherein the first and second optical axes form an angle between 20 and 45° between them.

2. A headlight according to claim 1, wherein the optical system comprises a paraboloidal reflector combined with an objective lens focusing the light rays emitted by the second light source and reflected by the second reflector onto the second concentration spot.

3. A headlight according to claim 1, wherein the optical system comprises a second elliptical reflector, the second light source being placed on a first focus of the second reflector, the second focus of the second reflector being located on the focal line of the lens, the focuses of the second reflector being aligned on the second optical axis.

4. A headlight according to claim 1, wherein the first reflector consists of two half-ellipsoids having the same focuses and different eccentricities.

5. A headlight according to claim 4, wherein the half-ellipsoid closest to the second reflector has an eccentricity greater than that of the half-ellipsoid furthest away from the second reflector.

6. A headlight according to claim 1, wherein a mask is placed on the main optical axis adjacent to the focal line of the lens in order to delimit a cut-off in the beam of light rays coming from the main light source.

7. A headlight according to claim 1, wherein a mask is placed on the second optical axis adjacent to the focal line of the lens in order to delimit a cut-off in the beam of light rays parallel to the second optical axis.

* * * * *